United States Patent Office 3,169,890
Patented Feb. 16, 1965

3,169,890
ACTIVE MATERIAL FOR A LEAD-ACID STORAGE BATTERY PLATE
Ernst Voss and Juergen Freundlich, both of Frankfurt am Main, Germany, assignors to Varta Aktiengesellschaft, Hagen, Westphalia, Germany, a corporation of Germany
No Drawing. Filed Dec. 11, 1961, Ser. No. 158,600
Claims priority, application Germany, Dec. 16, 1960, A 36,299
5 Claims. (Cl. 136—26)

The present invention relates to improved active materials for lead-acid storage battery plates and to a method of preparing such active materials.

Various processes for pasting the surface of battery plates with a lead compound, which is then formed into the active material of the finished battery, have been known since Faure patented such a process in 1881. One of the main problems in this process consists in drying the pasted plates before formation without producing cracks or fissures in the active material.

Many proposals have been made to overcome this problem, such as immersion of the pasted plates in sulfuric acid or accurate control of the time, temperature, and moisture conditions during the standing and drying period. Recognizable fissures on the surface of the active material have been prevented by such methods but X-ray examinations have shown internal fissures and cracks.

It is the primary object of the present invention to provide pasted plates for lead-acid storage batteries, which are internally and externally free of cracks.

It is another object of this invention to produce such improved battery plates in a fast and simple process.

It is also an object of the invention to provide a process for manufacturing a critical component for the active material of such plates.

The above and other objects are attained in accordance with the invention by adding elongated needle-shaped basic lead sulfate particles to the paste. These particles are capable of forming a felted fleece and prevent cracking of the active material in its interior as well as on its surface.

Useful basic lead sulfates include compounds of the formulas $PbO \cdot PbSO_4$, and $2\ PbO \cdot PbSO_4$, the preferred basic lead sulfate being the monobasic lead sulfate which occurs as lanarkite in nature.

The paste comprises a major portion of any conventional lead powder used for active material in pasted plates and from about 2% to about 35%, by weight of the active material, of crystalline, needle-shaped basic lead sulfate particles, the length of the particles being preferably between about 1 mm. and about 4 mm., for instance, between 1.5 mm. and 2.5 mm. The average diameter of the particles may vary, for instance, between about $50\mu$ and about $200\mu$.

The amount of the basic lead sulfate addition depends on the average length of the crystalline particles. The longer the particles, the smaller the amount of basic lead sulfate in the paste.

The lead powder component of the paste may consist of any of the lead oxides, or mixtures of lead oxides, used for this purpose in the lead-acid storage battery industry, such as described, for instance, in "Storage Batteries," by George Wood Vinal, Fourth Edition, on pages 21 to 23.

The basic lead sulfates may be produced according to the process described by J. Lander in J. Electrochem. Soc., vol 95, page 174 (1949).

Since basic lead sulfates which are useful for the purpose of the present invention are thermodynamically unstable in the presence of litharge (PbO), which is always part of conventional pastes for battery plates, the lead sulfate needles react on the surface with the litharge and form a three-dimensioned felted structure which resists cracking when the pasted plates are dried.

Experience has shown that such pasted plates may be readily dried and, dependent on the size and thickness of the plates, the moisture content thereof is reduced below 0.5% within five hours at elevated temperatures. Thus, the drying period is reduced by about four to ten times compared with drying periods of conventional pasted plates and the resultant plates show no cracks in their interior or on their surface, when dried, for instance, between about 70° C. and about 97° C.

Except for the addition of the basic lead sulfate needles, the pasting of the plates proceeds in a conventional manner, as described in the section on "Pasted Plates," beginning on page 27 of the above-named Vinal work.

With conventional pastes, shrinkage during drying amounts to as much as 30% by volume. Experiments with active material pastes containing about 3.5% to 7%, by weight, of basic lead sulfate needles of an average length of about 2 mm. in addition to a conventional lead powder, have shown a shrinkage of 7%, by volume, or less. The surfaces of the dried pasted plates were found to be free of cracks and no fissures could be detected internally by X-ray examination. This freedom from cracks and the mechanical stability of the active material was maintained after formation.

Crystalline needles or elongated particles of basic lead sulfate for use in the active materials of the present invention may be produced by sulfurizing an aqueous solution of basic lead acetate with amido sulfonic acid $NH_2 \cdot SO_2OH$ or a mono- or dialkyl sulfate at elevated temperature under pressure, cooling the reaction product, and separating the basic lead sulfate crystals.

The following examples illustrate useful methods of producing crystalline, elongated, needle-shaped basic lead sulfate particles which form felted structures according to the present invention.

Example 1

One mole of lead acetate and one mole of lead monoxide (PbO) are dissolved in five liters of water, the solution being expedited by heating the mixture to the boiling point. The undissolved residue is filtered off and, after cooling, a clear aqueous solution of basic lead acetate is obtained. This is mixed with an aqueous solution of one mole of amido sulfonic acid of the formula $$NH_2\text{—}SO_2OH$$

in one liter of water. The mixture is heated in an autoclave at a temperature of 135–137° C. under pressure for 57 minutes. After cooling, monobasic lead sulfate crystals are filtered off from the solution. The yield is 98.7%, based on the clear aqueous solution of basic lead acetate, and 71.7%, based on the starting materials.

Example 2

The clear aqueous solution of basic lead acetate, obtained according to Example 1, is reacted in an autoclave with a solution of one mole of dimethyl sulfate in 462 cc. of metanol. The reaction mixture is heated at a temperature of 129–132° C. under pressure for 62 minutes. The yield of the monobasic lead sulfate crystals filtered off from the cooled reaction mixture is 68%, based on the starting materials, and 99.1%, based on the clear basic lead acetate solution.

The following examples will illustrate pastes for lead-acid battery plates according to the present invention:

Example 3

1000 g. of lead powder (consisting of 75 parts of litharge and 25 parts of red lead) are mixed with 90 g. of monobasic lead sulfate (PbO.PbSO$_4$) particles having an average length of 2 mm. and 200 g. of sulfuric acid of a density of 1.08.

A conventional lead-antimony alloy grid is pasted with this mixture, the thickness of the paste layer being about 2 mm. The pasted plate is hung on a rack for drying at a temperature of about 92° C. and is fully dried to a moisture content of about 0.5% within 4½ hours. The resultant battery plate shows no internal or external cracks in the active material.

*Example 4*

Example 3 is followed but the paste contains 180 g. of monobasic lead sulfate needles of an average length of 1.5 mm. in place of 90 g. as in Example 3.

*Example 5*

A paste is prepared by mixing 62% of lead powder, 4.4% monobasic lead sulfate needles of an average length of 2.3 mm., 20.6% of water, and 13% of sulfuric acid of a density of 1.40, all parts being by weight.

Lead-antimony grids of a size of 50 mm. by 40 mm. are pasted with this paste, the paste layer having a thickness of about 2 mm. The pasted plates are dried in a drying chamber wherein hot air of a relative humidity of 40% is introduced counter-currently at a speed of 0.5 m./sec.

The drying temperature lies between 85° C. and 90° C. After 4½ hours, the moisture content of the pasted plates has been reduced to 0.3%, no cracks being discernible in the active material of the plates through surface or X-ray observation.

*Example 6*

Example 5 is repeated but the composition of the paste is as follows:

One kg. of lead powder, 100 g. of dibasic lead sulfate (2 PbO.PbSO$_4$) needles having an average length of 1.8 mm., 115 g. of water and, added to this mixture under steady stirring, 130 g. of sulfuric acid of a density of 1.40.

While it has been known to add fiber- or needle-shaped bodies of electrochemically inactive substances to the active material of battery plates, such substances reduce the capacity of the plates per volume unit and also often fail in imparting to the paste the required initial rigidity, while the elongated basic lead sulfate particles are converted into electrochemically active material upon formation without losing their ability of forming felt-like fleeces.

While the invention has been described in connection with certain preferred embodiments, it will be understood that many modifications and variations may occur to those skilled in the art without departing from the spirit and scope of the appended claims.

We claim:

1. A crack-free active material of a pasted storage battery plate, comprising felted elongated particles of basic lead sulfate selected from the group consisting of monobasic and dibasic lead sulfate.

2. An internally and externally crack-free active material of a pasted storage battery plate, comprising lead powder and between about 2% and about 35%, by weight of the active material, of felted elongated particles of basic lead sulfate selected from the group consisting of monobasic and dibasic lead sulfate.

3. The active material of claim 2, wherein the particles are needle-shaped bodies having an average length between about 1 mm. and about 4 mm.

4. The active material of claim 3, wherein the average length is between about 1.5 mm. and about 2.5 mm.

5. The active material of claim 2, wherein the basic lead sulfate is the basic lead sulfate of the formula PbO.PbSO$_4$.

References Cited by the Examiner

UNITED STATES PATENTS

| | | | |
|---|---|---|---|
| 2,249,330 | 7/41 | Stewart | 23—127 |
| 2,315,188 | 3/43 | Clapson | 23—127 |
| 2,841,631 | 7/58 | Zohn | 136—26 |
| 2,856,447 | 10/58 | Buskirk et al. | 136—26 |

FOREIGN PATENTS

| | | |
|---|---|---|
| 360,071 | 11/31 | Great Britain. |

OTHER REFERENCES

Lander: "Transactions of The Electrochemical Society," vol. 95, 1949, pages 174–186.

JOHN H. MACK, *Primary Examiner.*

JOSEPH REBOLD, JOHN R. SPECK, *Examiners.*